US009459991B2

(12) United States Patent
Vennam et al.

(10) Patent No.: US 9,459,991 B2
(45) Date of Patent: Oct. 4, 2016

(54) HEAP DUMP OBJECT IDENTIFICATION IN A HEAP DUMP ANALYSIS TOOL

(75) Inventors: Ramratan Vennam, Durham, NC (US); Patrick W. Wolf, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1646 days.

(21) Appl. No.: 12/651,076

(22) Filed: Dec. 31, 2009

(65) Prior Publication Data

US 2011/0161956 A1 Jun. 30, 2011

(51) Int. Cl.
*G06F 11/00* (2006.01)
*G06F 11/36* (2006.01)
*G06F 11/07* (2006.01)

(52) U.S. Cl.
CPC ......... *G06F 11/3664* (2013.01); *G06F 11/366* (2013.01); *G06F 11/0778* (2013.01)

(58) Field of Classification Search
CPC ............. G06F 11/0778; G06F 11/366; G06F 11/3664
USPC ........ 714/35, 38.11; 717/124–127, 130, 131; 718/1; 707/999.206
See application file for complete search history.

(56) References Cited

U.S. PATENT DOCUMENTS

| | | | |
|---|---|---|---|
| 6,725,345 B2* | 4/2004 | Baba et al. | 711/154 |
| 7,036,045 B2* | 4/2006 | Broussard et al. | 714/37 |
| 7,100,003 B2* | 8/2006 | Betancourt et al. | 711/159 |
| 7,313,661 B1* | 12/2007 | Dmitriev | 711/159 |
| 7,434,206 B2* | 10/2008 | Seidman et al. | 717/124 |
| 2006/0212852 A1* | 9/2006 | Hwang | 717/127 |
| 2006/0253845 A1* | 11/2006 | Achanta et al. | 717/151 |
| 2011/0029822 A1* | 2/2011 | Moser | 714/45 |

OTHER PUBLICATIONS

Sartor, Jennifer B.; Hirzel, Martin; McKinley, Kathryn S.; "No Bit Left Behind: The Limits of Heap Data Compression;" ISMM'08 Proceedings of the 7th International Symposium on Memory Management; Jun. 2008; pp. 111-120.*

* cited by examiner

*Primary Examiner* — Joseph Kudirka
(74) *Attorney, Agent, or Firm* — Steven M. Greenberg, Esq.; CRGO Law

(57) ABSTRACT

Embodiments of the present invention provide a method, system and computer program product for heap dump object identification in a heap dump analysis tool. In an embodiment of the invention, a method for heap dump object identification in a heap dump analysis tool can be provided. The method can include instrumenting an object with a uniquely identifiable marker, instantiating the instrumented object in a virtual machine executing in memory by a processor of a host computer and triggering a heap dump in the virtual machine. The method also can include parsing a heap dump file resulting from the triggered heap dump to locate a reference to the uniquely identifiable marker. Finally, the method can include displaying an association between the object and the heap dump file in a heap dump analysis tool executing in the memory by the processor of the host computer.

13 Claims, 1 Drawing Sheet

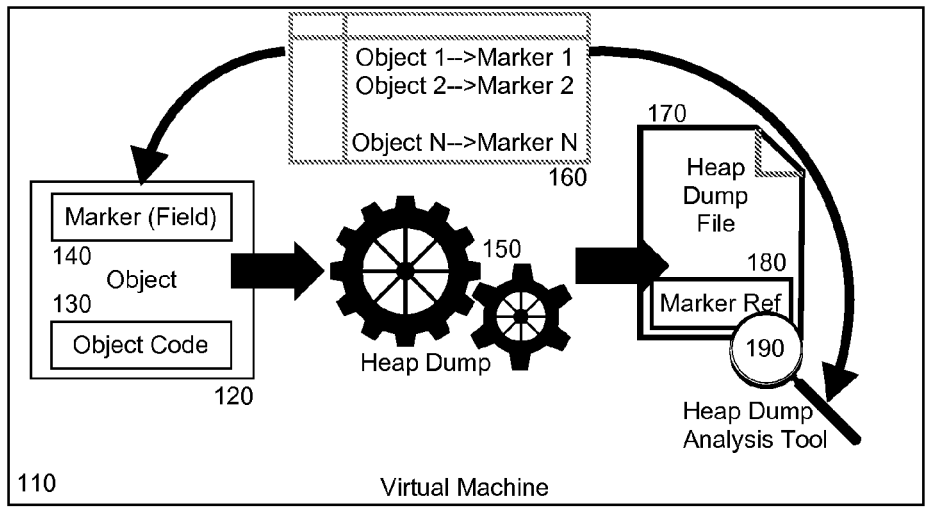
FIG. 1
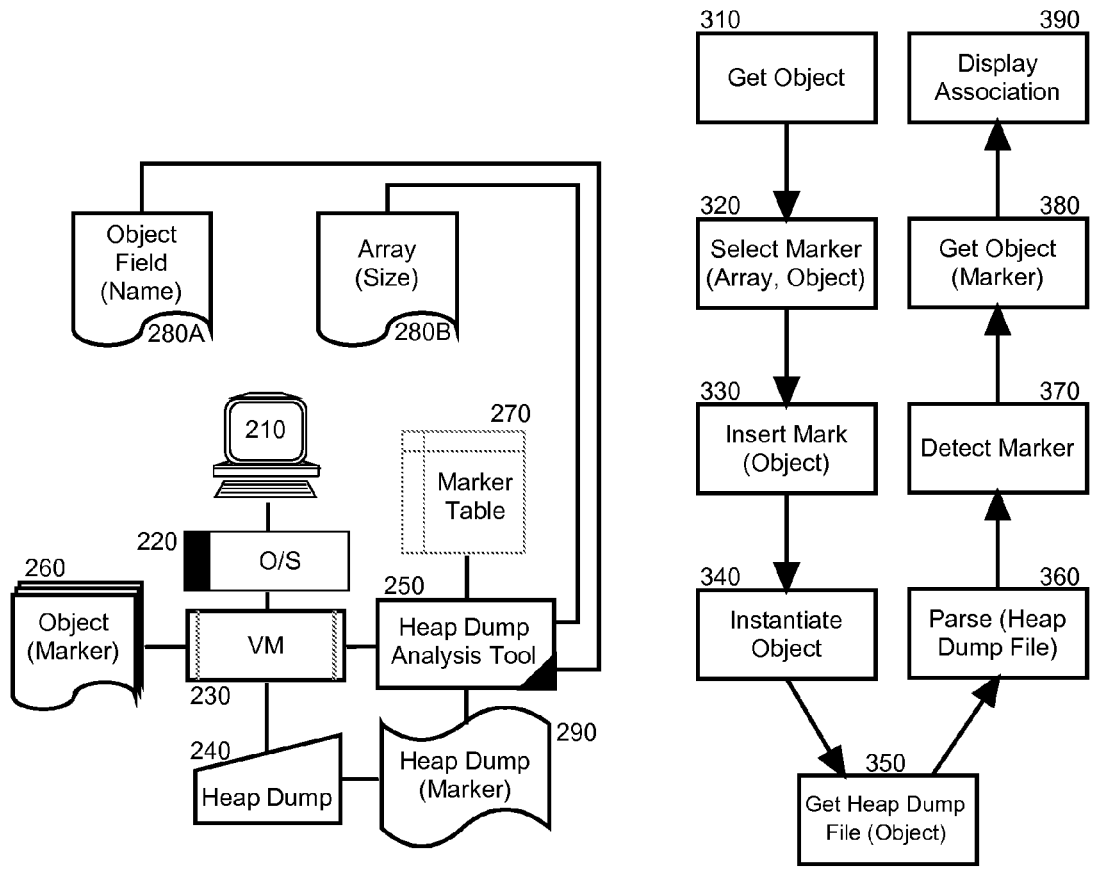
FIG. 2          FIG. 3

HEAP DUMP OBJECT IDENTIFICATION IN A HEAP DUMP ANALYSIS TOOL

BACKGROUND OF THE INVENTION

1. Field of the Invention

The present invention relates to code debugging and more particularly to heap dump analysis during debugging of an application.

2. Description of the Related Art

The art of software development extends far beyond a mere coding of a functional specification for a computer program. Modern software development conforms to a lifecycle which begins with the functional specification leading into the formulation of a suitable architecture for an application implementing the functional specification. The lifecycle continues with the physical coding of the application and includes iterative testing and debugging cycles to ensure the integrity of the code. Finally, the execution of the debugged code can be analyzed to facilitate the further revision of the code to improve the performance of the code.

Core dumping has always been integral to debugging a failed computing application. In computing, a core dump generally includes the recorded state of the working memory of a failed computer program at a specific time, generally when the program terminated abnormally. In practice, other important elements of program state are dumped at the same time into the same file, including the processor registers, which may include the program counter and stack pointer, memory management information, and other processor and operating system flags and information. On many operating systems, a fatal error occurring during program execution automatically triggers a core dump.

The heap dump, as a species of the core dump, remains an integral part of the debugging process—particularly with respect to the Java™ virtual machine. A heap dump, as it is well known in the art, pertains to the automated listing of the content of the dynamic memory responsive to an out of memory condition resulting in an application crash. In the Java programming environment, for example, a head dump arises responsive to a pre-set preference in the Java virtual machine (JVM) and the occurrence of a OutOfMember exception. Alternatively, a heap dump can be manually provoked using the "jmap" tool. In either circumstance, the resultant file can be unintelligible without the assistance of a heap dump analysis tool.

The "Heap Analysis Tool" (HAT) distributed with the Java standard edition is a software tool providing a user interface through which a heap dump file can be browsed. The most recent form of HAT even permits the execution of queries against a loaded heap dump file. HAT largely provides assistance in debugging memory leaks (also known as object retention issues). Even still, because the Java environment does not expose physical memory addresses in a heap dump, correlating structures in a heap dump to program code creating or manipulating those structures can be complicated. By way of example, objects created thread local are fields in a class, however, thread local objects do not necessarily appear as fields in a class in a heap dump. Thus, for the debugger, determining the class that initialized a thread local object from a heap dump can be difficult and oftentimes not possible.

BRIEF SUMMARY OF THE INVENTION

Embodiments of the present invention address deficiencies of the art in respect to heap dump analysis and provide a novel and non-obvious method, system and computer program product for heap dump object identification in a heap dump analysis tool. In an embodiment of the invention, a method for heap dump object identification in a heap dump analysis tool can be provided. The method can include instrumenting an object with a uniquely identifiable marker, instantiating the instrumented object in a virtual machine executing in memory by a processor of a host computer and triggering a heap dump in the virtual machine. The method also can include parsing a heap dump file resulting from the triggered heap dump to locate a reference to the uniquely identifiable marker. Finally, the method can include displaying an association between the object and the heap dump file in a heap dump analysis tool executing in the memory by the processor of the host computer.

In one aspect of the embodiment, the marker is an array of pre-determined and unique length. In another aspect of the embodiment, the marker is a generic object field in the object of a unique name. In yet another aspect of the embodiment, triggering a heap dump in the virtual machine, includes automatically triggering a heap dump in the virtual machine responsive to an out of memory condition in the virtual machine. In contrast, in even yet another aspect of the embodiment, triggering a heap dump in the virtual machine, includes manually invoking the heap dump from a command line directive in the virtual machine.

In another embodiment of the invention, a heap dump analysis data processing system can include a host computer with at least one processor and memory, a virtual machine executing in the memory of the host computer and heap dump logic included as part of the virtual machine. The system also can include a heap dump analysis tool executing in the virtual machine. The heap dump analysis tool includes program code enabled to instrument an object with a uniquely identifiable marker, to parse a heap dump file resulting from a triggered heap dump in the virtual machine in order to locate a reference to the uniquely identifiable marker, and to display an association between the object and the heap dump file. As before, in one aspect of the embodiment, the marker is an array of pre-determined and unique length, while in another aspect of the embodiment, the marker is a generic object field in the object of a unique name.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a pictorial illustration of a process for heap dump object identification in a heap dump analysis tool;

FIG. 2 is a schematic illustration of a heap dump analysis data processing system configured for heap dump object identification; and, FIG. 3 is a flow chart illustrating a process for heap dump object identification in a heap dump analysis tool.

DETAILED DESCRIPTION OF THE INVENTION

Embodiments of the invention provide for heap dump object identification in a heap dump analysis tool. In accordance with an embodiment of the invention, a marker can be inserted into an object. The marker can include an array field of pre-determined size. Alternatively, the marker can be a generic object field. Thereafter, the object can be instantiated in debug mode and a heap dump can be triggered, either automatically as a result of an out of memory exception, or manually through a virtual machine directive. Upon triggering of the heap dump, the marker can be written to the heap dump file in association with the object. In this way, the object in the heap dump can be recognized by reference to the marker known to be associated with the object a priori.

In further illustration, FIG. 1 is a pictorial illustration of a process for heap dump object identification in a heap dump analysis tool. As shown in FIG. 1, an object 120 encapsulating object code 130 in a virtual machine 110 can be instrumented with a marker 140. The marker 140, by way of example, can be an array of pre-determined and unique size, or a generic object field with a pre-determined and unique name. An association 160 can be maintained between the maker 140 and the object 120. Thereafter, when a heap dump 150 generates a heap dump file 170 for the object 120, a heap dump analysis tool 190 can inspect the heap dump file 170 to locate a reference to the marker 180. Thereafter, the reference to the marker 180 can be compared to the association 160 in order to identify the object 120 in the heap dump file 170.

The process described in connection with FIG. 1 can be implemented in a heap dump data processing system. In yet further illustration, FIG. 2 schematically depicts a heap dump analysis data processing system configured for heap dump object identification. The system can include a host computer 210 with at least one processor and memory. The host computer 210 can support the execution of an operating system 220 that in turn can host the operation of a virtual machine 230 such as a JVM. The virtual machine 230 can include a heap dump 240 configured to automatically trigger the generation of a heap dump file 290 in response to an out of memory condition, or the heap dump 240 can be configured to manually generate the heap dump file 290 responsive to a command line directive in the virtual machine 230.

Of note, a heap dump analysis tool 250 can be coupled to the virtual machine 230. The heap dump analysis tool 250 can include program code enabled upon execution in the virtual machine 230 to instrument an object 260 with a marker 280A, 280B associated with the object 260 in a marker table 270. In this regard, the marker 280A, 280B can be a generic object field 280A with a unique name disposed in the object 260. Alternatively, the marker 280B can be an array defined for a field of the object 260 to be of a pre-determined, arbitrary and unique size. In either circumstance, the program code of the heap dump analysis tool 250 can be further enabled to parse a heap dump filed 290 produced by the heap dump 240 in order to detect the presence of a reference to the marker 280A, 280B. Upon detecting the presence of the reference to the marker 280A, 280B, the heap dump analysis tool can compare the reference to the marker 280A, 280B to entries in the marker table 270 in order to identify the object 260 associated with the marker 280A, 280B.

In even yet further illustration of the operation of the heap dump analysis tool 250, FIG. 3 is a flow chart illustrating a process for heap dump object identification in a heap dump analysis tool. Beginning in block 310, an object can be selected for instrumentation and in block 320, a particular type of marker can be chosen such as an array of arbitrary and unique value, or a generic object field. In block 330 a marker for the chosen marker type can be inserted into the object and in block 340 the object can be instantiated. In block 350, a heap dump can be triggered for the object and in block 360, the resulting heap dump file can be parsed.

In block 370, a reference to the marker can be detected in the heap dump file. Thereafter, in block 380 the associated object can be identified, for example in the case of the marker as a generic object, the name of the generic object in the heap dump file can be used to locate the associated object. Likewise, in the case of the marker as an array of pre-determined but arbitrary size, an array of the pre-determined by arbitrary size in the heap dump file can be used to locate the associated object. In either case, in block 390 the associated object can be displayed in connection with the heap dump. In this way, the content of the heap dump file including its objects and resources can be directly correlated with a creator or owner of those objects and resources despite the limitations of the virtual machine in providing specific addressing information in a heap dump file.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for heap dump object identification in a heap dump analysis tool, the method comprising:
    instrumenting an object with a uniquely identifiable marker;
    instantiating the instrumented object in a virtual machine executing in memory by a processor of a host computer;
    triggering a heap dump in the virtual machine;
    parsing a heap dump file resulting from the triggered heap dump to locate a reference to the uniquely identifiable marker, the reference referring to an entry in a table, the table including a plurality of columns and a plurality of rows correlating objects to different uniquely identifiable markers, each uniquely identifiable marker being distinct from the different uniquely identifiable markers in the table;
    comparing the reference to entries in the table to identify the object associated with the uniquely identifiable marker; and, displaying an association between the object and the heap dump file in a heap dump analysis tool executing in the memory by the processor of the host computer, the displayed association correlating the object with one of a creator or an owner of the object.

2. The method of claim 1, wherein the marker is an array of pre-determined and unique length.

3. The method of claim 1, wherein the marker is a generic object field in the object of a unique name.

4. The method of claim 1, wherein triggering the heap dump in the virtual machine comprises automatically triggering a heap dump in the virtual machine responsive to an out of memory condition in the virtual machine.

5. The method of claim 1, wherein triggering the heap dump in the virtual machine comprises manually invoking the heap dump from a command line directive in the virtual machine.

6. A heap dump analysis data processing system comprising:
   a host computer with at least one processor and memory;
   a virtual machine executing in the memory of the host computer;
   heap dump logic included as part of the virtual machine; and
   a heap dump analysis tool executing in the virtual machine, the heap dump analysis tool comprising program code enabled to instrument an object with a uniquely identifiable marker, to parse a heap dump file resulting from a triggered heap dump in the virtual machine in order to locate a reference to the uniquely identifiable marker, the reference referring to an entry in a table, the table including a plurality of columns and a plurality of rows correlating objects to the uniquely identifiable markers, each uniquely identifiable marker being distinct from the different uniquely identifiable markers in the table, to compare the reference to entries in the table to identify the object associated with the uniquely identifiable marker, and to display an association between the object and the heap dump file, the displayed association correlating the object with one of a creator or an owner of the object.

7. The system of claim 6, wherein the marker is an array of pre-determined and unique length.

8. The system of claim 6, wherein the marker is a generic object field in the object of a unique name.

9. A computer program product comprising a computer readable storage medium embodying computer readable program code for heap dump object identification, the computer program product comprising:
   computer readable program code for instrumenting an object with a uniquely identifiable marker;
   computer readable program code for instantiating the instrumented object in a virtual machine executing in memory by a processor of a host computer;
   computer readable program code for triggering a heap dump in the virtual machine;
   computer readable program code for parsing a heap dump file resulting from the triggered heap dump to locate a reference to the uniquely identifiable marker, the reference referring to an entry in a table, the table including a plurality of columns and a plurality of rows correlating objects to different uniquely identifiable markers, each uniquely identifiable marker being distinct from the different uniquely identifiable markers in the table;
   computer readable program code for comparing the reference to entries in the table to identify the object associated with the uniquely identifiable marker; and,
   computer readable program code for displaying an association between the object and the heap dump file in a heap dump analysis tool executing in the memory by the processor of the host computer, the displayed association correlating the object with one of a creator or an owner of the object.

10. The computer program product of claim 9, wherein the marker is an array of pre-determined and unique length.

11. The computer program product of claim 9, wherein the marker is a generic object field in the object of a unique name.

12. The computer program product of claim 9, wherein the computer readable program code for triggering the heap dump in the virtual machine, comprises computer readable program code for automatically triggering a heap dump in the virtual machine responsive to an out of memory condition in the virtual machine.

13. The computer program product of claim 9, wherein the computer readable program code for triggering the heap dump in the virtual machine, comprises computer readable program code for manually invoking the heap dump from a command line directive in the virtual machine.

* * * * *